United States Patent
Højlund Nielsen et al.

(10) Patent No.: US 11,505,461 B2
(45) Date of Patent: Nov. 22, 2022

(54) PROCESS FOR STEAM REFORMING OF OXYGENATES AND CATALYSTS FOR USE IN THE PROCESS

(71) Applicant: HALDOR TOPSØE A/S, Kgs. Lyngby (DK)

(72) Inventors: Poul Erik Højlund Nielsen, Fredensborg (DK); Brian Kjærgaard Olsen, Copenhagen S (DK); Lived J. Lemus-Yegres, Copenhagen S (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 301 days.

(21) Appl. No.: 16/609,019

(22) PCT Filed: May 3, 2018

(86) PCT No.: PCT/EP2018/061269
§ 371 (c)(1),
(2) Date: Oct. 28, 2019

(87) PCT Pub. No.: WO2018/206376
PCT Pub. Date: Nov. 15, 2018

(65) Prior Publication Data
US 2020/0239305 A1     Jul. 30, 2020

(30) Foreign Application Priority Data
May 10, 2017 (DK) .............. PA 2017 00294

(51) Int. Cl.
   *C01B 3/32*     (2006.01)
   *B01J 27/22*     (2006.01)
   *B01J 37/02*     (2006.01)
(52) U.S. Cl.
   CPC .............. *C01B 3/326* (2013.01); *B01J 27/22* (2013.01); *B01J 37/0201* (2013.01);
(Continued)

(58) Field of Classification Search
   CPC ............ C01B 3/326; C01B 2203/0233; C01B 2203/061; C01B 2203/068;
(Continued)

(56) References Cited

U.S. PATENT DOCUMENTS

2002/0198101 A1    12/2002   Gaffney
2007/0010590 A1    1/2007   Abbott et al.
(Continued)

FOREIGN PATENT DOCUMENTS

EA     200501735 A1    6/2006
WO     02066371 A2    8/2002
(Continued)

OTHER PUBLICATIONS

Anjaneyulu et al. "Effect of Zn addition on the performance of Ni/Al2O3catalyst for steam reforming of ethanol" Applied Catalysis A: General 519 (2016) 85-98 (Year: 2016).*
(Continued)

*Primary Examiner* — Steven J Bos
*Assistant Examiner* — Syed T Iqbal
(74) *Attorney, Agent, or Firm* — Buchanan Ingersoll & Rooney P.C.

(57) ABSTRACT

In a process for steam reforming of oxygenates, especially at low steam-to-carbon (S/C) ratios, a feed gas containing oxygenates, such as ethanol, is converted into syngas over a ternary carbide catalyst. Then the reformed gas is either transformed into desired chemicals or mixed into the feed stream to the reformer in a plant, such as an ammonia or methanol plant. The preferred ternary carbide is nickel zinc carbide.

1 Claim, 5 Drawing Sheets

(52) U.S. Cl.
CPC .......... *C01B 2203/0233* (2013.01); *C01B 2203/061* (2013.01); *C01B 2203/068* (2013.01); *C01B 2203/1058* (2013.01); *C01B 2203/1217* (2013.01)

(58) Field of Classification Search
CPC .... C01B 2203/1058; C01B 2203/1217; C01B 2203/1076; C01B 2203/1229; B01J 27/22; B01J 37/0201; Y02P 20/52
See application file for complete search history.

(56) References Cited

U.S. PATENT DOCUMENTS

2014/0134098 A1    5/2014   Faria et al.
2014/0191137 A1    7/2014   O'keefe

FOREIGN PATENT DOCUMENTS

WO    2012154042 A1    11/2012
WO    2014078226 A1    5/2014
WO    2016062551 A1    4/2016

OTHER PUBLICATIONS

Barroso et al. "Hydrogen production by ethanol reforming over NiZnAl catalysts", Applied Catalysis A: General 304 (2006) 116-123 (Year: 2006).*

Office Action dated Apr. 21, 2021, by the Eurasian Patent Organizations (EAPO) in corresponding Eurasian Patent Application No. 201992624, and an English Translation of the Office Action. (9 pages).

Korobtsev, S. V. et al. "Production of hydrogen from organic raw materials" Alternative Fuel, 2013, No. 6, vol. 36, 7 pages.

Danish Search Report for Danish Application No. PA 2017 00294 dated Nov. 9, 2017.

International Search Report (PCT/ISA/210) dated Jul. 13, 2018, by the European Patent Office as the International Searching Authority for International Application No. PCT/EP2018/061269.

Written Opinion (PCT/ISA/237) dated Jul. 13, 2018, by the European Patent Office as the International Searching Authority for International Application No. PCT/EP2018/061269.

Akiyama, M., et al., "Steam reforming of ethanol over carburized alkali-doped nickel on zirconia and various supports for hydrogen production", Catalysis Today, 2012, vol. 181, Issue 1, pp. 4-13.

Anjaneyulu, C., et al., "Effect of Zn addition on the performance of Ni/Al2O3 catalyst for steam reforming of ethanol", Applied Catalysis A: General, vol. 519, Jun. 6, 2016, pp. 85-98.

Galetti, A., et al., "Hydrogen production by ethanol reforming over NiZnAl catalysts Influence of Ce addition on carbon deposition", Applied Catalysis A: General, vol. 348, No. 1, Sep. 30, 2008, pp. 94-102.

Ma, Y., et al., "Catalytic activity and stability of nickel-modified molybdenum carbide catalysts for steam reforming of methanol", The Journal of Physical Chemistry C, 2014, vol. 118, Issue 18, pp. 9485-9496.

Miyamoto, Y., et al., "Steam reforming of ethanol over nickel Molybdenum carbides for hydrogen production", Catalysis Today, vol. 146, No. 1-2, Aug. 15, 2009, pp. 87-95.

Shao, H., et al., "Use of Bimetallic Carbide Catalyst for Steam Reforming of Alcohols for Hydrogen Formation", 2005 AIChE Annual Meeting and Fall Showcase, Conference Proceedings, 2005, p. 10065.

Sokolov, S., et al., "Low-temperature CO2 reforming of methane over Ni supported on ZnAl mixed metal oxides", International Journal of Hydrogen Energy, vol. 42, No. 15, pp. 9831-9839.

Office Action (The First Office Action) dated Jul. 14, 2022, by the State Intellectual Property Office of the People's Republic of China in corresponding Chinese Patent Application No. 201880030200.8, and an English Translation of the Office Action. (12 pages).

* cited by examiner

PROCESS FOR STEAM REFORMING OF OXYGENATES AND CATALYSTS FOR USE IN THE PROCESS

The present invention relates to a process for steam reforming of oxygenates and a novel catalyst for use in the process. More specifically, this novel catalyst is a ternary nickel zinc carbide.

Steam reforming is an important industrial process, where natural gas is converted into synthesis gas (CO and $H_2$).

At high temperatures (700-1100° C.) and in the presence of a metal-based catalyst, typically nickel, steam reacts with methane to yield carbon monoxide and hydrogen according to the reaction $$CH_4 + H_2O \leftrightarrow CO + 3H_2$$

The synthesis gas is subsequently transformed into more valuable chemicals, such as ammonia and methanol. Since steam reforming acts as a source of hydrogen, it is also potentially important for any emerging hydrogen economy. The steam reforming reaction is traditionally performed over a Ni-based catalyst due to the relatively low cost and good activity of nickel. The major technological challenge for Ni catalysts is the formation of carbonaceous deposits (i.e. coke) that lead to catalyst deactivation. Other transition metals, such as Ru, Rh, Pd, Ir and Pt, also display high activity and selectivity towards steam reforming, and they have a high resistance against carbon formation. These materials, however, are scarce in nature and also very expensive. Therefore, new materials that are resistant to carbon formation are needed.

Oxygenates are compounds containing oxygen as a part of their chemical structure. Alcohols and ethers are the most commonly used oxygenates.

Steam reforming of oxygenates, such as ethanol, over base metal catalysts is difficult, especially at low steam-to-carbon (S/C) ratios, due to the risk of carbon formation. Even though alloying of the base metal could be a possible way to amend the carbon formation potential (because the carbon nucleation sites become physically separated in the crystal lattice), there is still a need for efficient and reliable catalysts for steam reforming of oxygenates.

The existence of a number of stable ternary carbides, such as nickel zinc carbide, was reported in "Ternary Carbides of the Transition Metals Nickel, Cobalt, Iron, Manganese with Zinc and Tin" by H. H. Stadelmaier and L. J. Huetter (Acta Metallurgica 7, 415-419 (1959)). In the ternary systems Co—Sn—C, Fe—Sn—C, Ni—Zn—C, Co—Zn—C and Fe—Zn—C, double carbides corresponding to the formula $T_3BC_x$, where T is the transition metal, were found. Such carbides have an ordered face-centered cubic structure. No catalytic properties of these carbides have ever been reported in the literature.

However, certain ternary carbides do have interesting catalytic properties. Thus, $Ni_3ZnC_{0.7}$ is a selective methanol catalyst, however with a rather modest activity. But it has surprisingly been found that it possesses a high activity in converting oxygenates, such as ethanol and n-propanol as well as acetic acid and ethylene glycol, into synthesis gas.

Carbide catalysts are sparsely described in the prior art. WO 2016/062551 A1, belonging to the Applicant, discloses a process for catalytic preparation of hydrogen cyanide from methane and ammonia, wherein a catalyst material comprising a first and a second metal on a support is used. The support can i.a. be a carbide, and the first and the second metal are selected from Fe, Co and Ni and from Sn, Zn and In, respectively. In US 2002/0198101 A1, a process for producing synthesis gas, i.e. a gas mixture comprising CO and $H_2$, from lower alkanes using a metal carbide catalyst is described.

Processes for steam reforming of oxygenates are described in WO 2012/154042 A1 and in US 2014/0134098 A1, wherein catalysts other than ternary carbides are used. In the WO citation, the catalyst is an externally heated steam reforming catalyst, such as a nickel-based catalyst, and in the US citation, the catalyst comprises a metal/metal promoter on a nickel/transition metal blend catalyst supported on a high-energy lattice metal oxide.

WO 2014/078226 A1 deals with low-temperature reforming of oxygenates in an adiabatic fixed-bed reactor containing a metal catalyst selected from Au, Ni, Cu, Fe, K, MgO, $CeO_2$, $Al_2O_3$ and combinations thereof.

So far, no satisfactory procedure for the pre-reforming of oxygenates has been available. The attitude has been either to avoid oxygenates or to treat them in a stream containing a large surplus of hydrogen. Now, however, it has turned out that a group of ternary carbides are well-suited as catalysts for steam reforming of oxygenates.

Thus the present invention relates to a novel process for steam reforming of oxygenates, especially at low steam-to-carbon (S/C) ratios, in which a feed gas containing oxygenates, such as ethanol, is converted into syngas according to the reactions $$C_2H_5OH + 3H_2O \leftrightarrow 2CO_2 + 6H_2 \text{ or}$$

$$C_2H_5OH + H_2O \leftrightarrow OH_4 + CO_2 + H_2$$

over a nickel zinc carbide catalyst, where the reformed gas is subsequently either transformed into desired chemicals or mixed into the feed stream to the reformer in a plant, such as an ammonia or methanol plant.

The invention further relates to a steam reforming catalyst for use in the process, said catalyst consisting of a nickel-containing catalyst for steam reforming, onto which a ternary carbide has been applied as a top layer.

Typically, small amounts of oxygenates will be present in the condensates after a WGS (water gas shift) reactor or a methanol reactor. By using a catalyst according to the invention, a recycle of the oxygenates will be possible. In the ammonia process, condensates containing ethanol and acetic acid can be recycled to the catalyst bed along with methanol and water, provided that the catalyst bed has a top layer of a catalyst according to the invention. In a similar manner, the higher alcohols in a methanol plant can be recycled via the pre-reformer, again provided that the catalyst bed has a top layer of a catalyst according to the invention.

The catalyst according to the invention can be prepared by mixing ethanol with water in a ratio corresponding to the reaction $$C_2H_5OH + 3H_2O \leftrightarrow 2CO_2 + 6H_2$$

adding a small amount of methanol,
preparing a nickel-containing catalyst by a selected impregnation procedure, and
feeding the reaction mixture into a stream of nitrogen and passing it over the catalyst at a suitable temperature under a pressure between ambient pressure and 5 MPa.

The impregnation procedure is preferably selected from co-impregnation of nickel and zinc onto alumina, impregnation of a steam reforming nickel catalyst with zinc, and impregnation of a zinc-alumina spinel with nickel.

For example, the catalyst bed is prepared by impregnating zinc oxide and a zinc-alumina spinel, such as Applicant's SK-501, with nickel nitrate corresponding to around 5 wt % Ni. Prior to the conversion reaction, the catalyst is reduced using hydrogen and methanol. Other experiments have shown that this approach ensures the formation of the desired nickel zinc carbide.

The reaction mixture is pumped into a stream of nitrogen and passed over the catalyst under a pressure close to ambient pressure. The temperature can be varied from room temperature to around 800-900° C.

The methanol in the reaction mixture ensures the stability of the carbide phase at the inlet. The reforming of ethanol is almost complete at 400° C. No pressure increase is observed, unlike what is seen in experiments with other nickel catalysts.

The invention is described further in the following experimental section. More specifically, a series of oxygenate steam reforming experiments has been carried out over a range of Ni—Zn based catalysts, including Applicant's steam reforming nickel catalyst R-67 impregnated with zinc. The details of the experiments are given in the experimental section below.

EXPERIMENTAL

Three Ni—Zn based catalysts were used: (1) Ni and Zn co-impregnated onto $Al_2O_3$, (2) R-67 impregnated with Zn and (3) SK-501 impregnated with Ni.

The experiments were conducted in TPX-3A using a U-tube quartz reactor with an inner diameter of 4 mm. Each test was carried out using a catalyst loading of 600 mg (sieve fraction: 300-600 μm), fixed between two layers of quartz wool. The reactor temperature was measured by a thermocouple secured on the outside of the reactor.

Prior to any experiment, the given catalyst was reduced in 200 Nml/min of 10 vol % hydrogen in nitrogen, either with or without 5 vol % methanol. The exact reduction procedure used in each experiment is given in Table 1 below.

During experiments, an oxygenate/water mixture was fed to an evaporator (⅛" steel tube filled with SiC) by a syringe pump and mixed with nitrogen—typically to a total gas flow of 100 Nml/min. The specific oxygenates and steam-to-carbon (S/C) ratios used in each experiment are also listed in Table 1.

TABLE 1

Overview of oxygenate reforming experiments

| Run No. | Catalyst | Pre-treatment | Oxygenate(s) (S/C) |
|---|---|---|---|
| 1 | 12 wt % Ni, 16 wt % Zn/$Al_2O_3$ | Heating to 600° C. at 5° C./min in 10 vol % $H_2/N_2$ (200 Nml/min). Treatment at 600° C. for 6 h in 10 vol % $H_2/N_2$ (200 Nml/min). | Methanol + ethanol (0) |
| 2 | 12 wt % Ni, 16 wt % Zn/$Al_2O_3$ | Reactor loading from run No. 1 | Ethanol (1.50) |
| 3 | 12 wt % Ni, 16 wt % Zn/$Al_2O_3$ | Treatment at 600° C. for 6 h in 5 vol % methanol, 10 vol % $H_2/N_2$ (200 Nml/min). | Propanol (1.67) |
| 4 | 18 wt % Zn/R-67 | Treatment at 400° C. for 6 h in 5 vol % methanol, 10 vol % $H_2/N_2$ (200 Nml/min). | Propanol (1.63) |
| 5 | 6 wt % Ni/SK-501 | Heating to 250° C. at 5° C./min in 10 vol % $H_2/N_2$ (200 Nml/min). Treatment at 250° C. for 0.75 h in 5 vol % methanol, 10 vol % $H_2/N_2$ (200 Nml/min). | Propanol (1.63) Ethanol (1.47) acetic acid + ethanol (1.22) ethylene glycol (0.95). |

Spent catalysts from the oxygenate reforming tests have been characterized by X-ray diffraction spectroscopy. Except for the first experiment, the S/C corresponds to an oxygen-to-carbon ratio of about 2. The exit gas composition with respect to hydrogen, carbon monoxide, methane, ethylene and ethane was measured by gas chromatography (GC).

Results and Discussion

Figure 1:
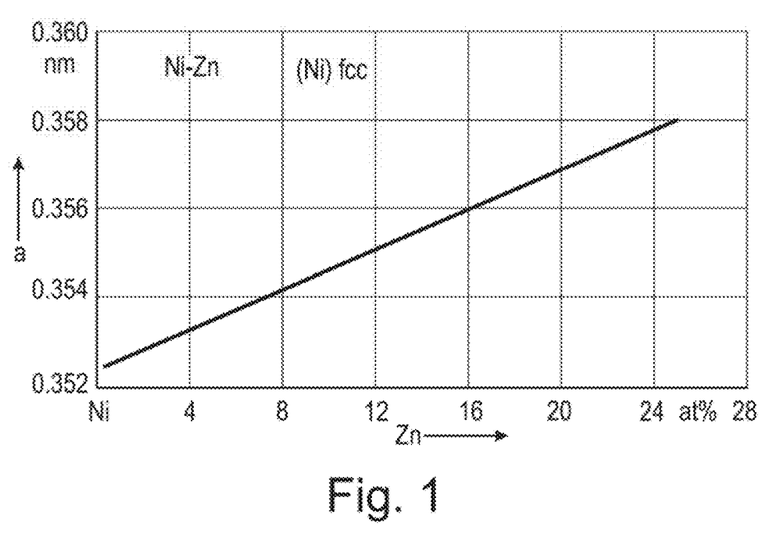
FIG. 1 shows the lattice parameter for face centered cubic (Ni) solid solution in the Ni—Zn system according to the above-cited Stadelmaier and Huettel reference.
Figure 2:
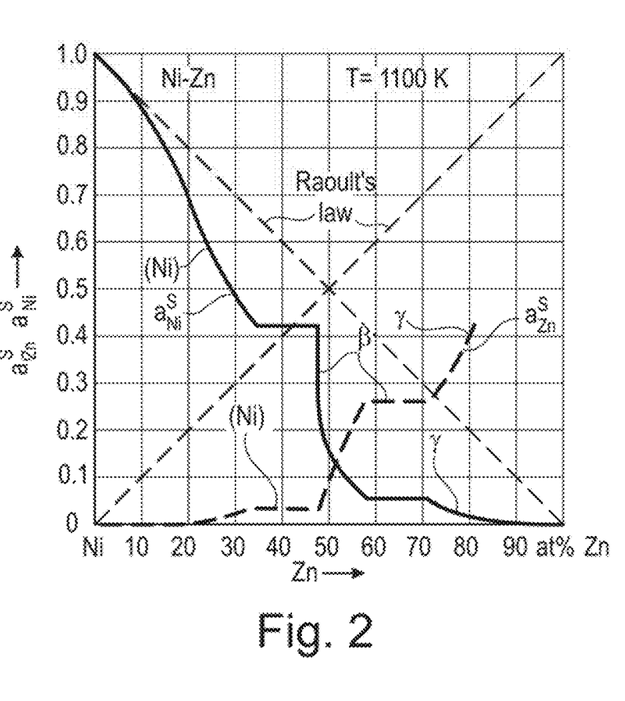
FIG. 2 shows the thermodynamic activities for solid solutions of Ni and Zn at 1100 K according to the same reference.

Table 2 below shows the phase distribution in the spent catalysts as measured by X-ray diffraction spectroscopy. No nickel zinc carbides are found in the spent samples from run Nos. 2 and 3, which both originated from the same sample. In the sample from run No. 2, zinc is only present as $ZnAl_2O_4$, while zinc is likely present in the spinel phase reported for spent catalyst from run No. 3. These results indicate that the zinc oxide, initially present at the surface of the catalyst, has been consumed by the alumina support during the experiments, e.g. facilitated by the steam in the reaction gas. Graphite (or traces thereof) is found in both samples. The sample from run No. 4 contains $Ni_3ZnC$, Ni, ZnO and MgO. It is likely that some of the ZnO, impregnated onto the surface of the nickel catalyst R-67, has exchanged place with MgO in the spinel. For the spent catalyst from run No. 5, two nickel alloy phases with lattice constants of 3.618 and 3.568, respectively, have been found. Stadelmaier and Huettel (cited above), who first reported the existence of nickel zinc carbide, found a $Ni_3ZnC_{0.7}$ phase with a lattice constant of 3.65 kX (approximately equal to 3.65 Å) and a second phase with a lattice parameter of 3.53-3.55 kX depending on the zinc content. The latter phase was accredited to a solid solution of Ni and Zn. The formation of a binary Ni—Zn phase (with a lattice constant of 3.568 Å) during run No. 5 is, however, highly unlikely. Such an alloy would have a zinc content of about 20 at % according to FIG. 1. From FIG. 2 it appears that the activity of Zn (at 1100 K) in such a system is quite low. Hence it is doubtful that ZnO has been reduced to form this alloy, either during the reduction step (temperature 250° C.) or during the experiment (max. temperature 600° C., S/C=1.63).

The X-ray diffraction spectroscopy results indicate that a spinel carrier, preferably $ZnAl_2O_4$, should be used rather than $Al_2O_3$ in order to ensure formation of the nickel zinc carbide.

TABLE 2

Results from X-ray diffraction (XRD) analysis

| Run No. | XRD Rietveld refinement |
|---|---|
| 2 | 8.7 wt % Ni, 14.9 wt % graphite, 32.1 wt % γ-$Al_2O_3$ and 44.3 wt % $ZnAl_2O_4$ (a = 8.042 Å). |
| 3 | (Uncertain Rietveld refinement) 0.7 wt % Ni, 3.1 wt % α-$Al_2O_3$ and 96.3 wt % spinel (a = 8.012 Å). Traces of graphite cannot be excluded. |
| 4 | 7.4 wt % $Ni_3ZnC$ (a = 3.652 Å), 3.6 wt % Ni, 8.9 wt % ZnO, 8.8 wt % MgO, 4.4 wt % α-$Al_2O_3$ and 66.9 wt % spinel (a = 8.081 Å). |
| 5 | 0.5 wt % Ni-alloy 1 (a = 3.618 Å) and 11.9 wt % Ni-alloy 2 (a = 3.568 Å) plus 8.6 wt % ZnO, 19.7 wt % graphite and 59.3 wt % spinel (a = 8.094 Å). |

Figure 3:
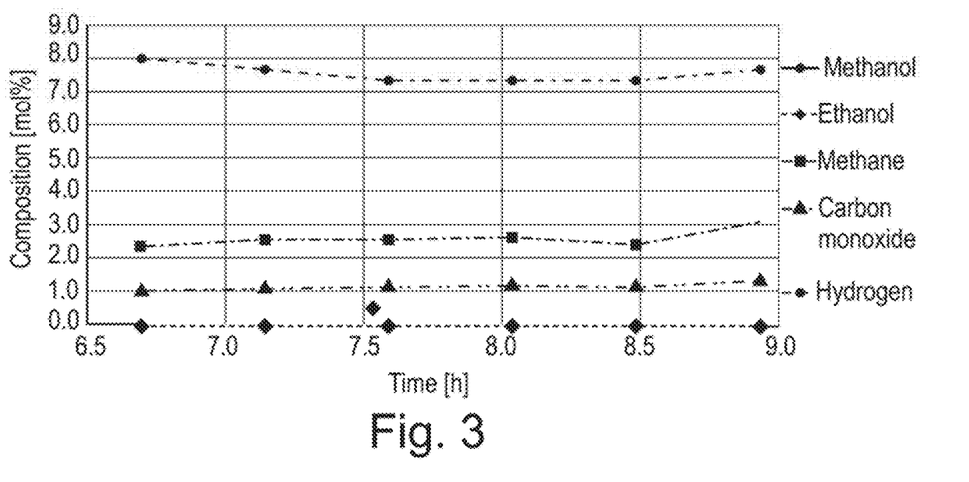
FIG. 3 illustrates the measured exit gas composition in run No. 1 with respect to methanol, ethanol, methane, carbon monoxide and hydrogen as a function of time. Inlet conditions: 4.5 vol % methanol and 4.5 vol % ethanol in nitrogen; total flow 100 Nml/min; temperature 500° C.

FIG. 3 shows the exit concentration of methanol, ethanol, methane, carbon monoxide and hydrogen, measured during run No. 1 using a total gas flow of 100 Nml/min, containing 4.5 vol % methanol and 4.5 vol % ethanol in nitrogen, at a reactor temperature of 500° C. It appears from the Figure that the alcohols are completely converted at 500° C., and the production of methane, carbon monoxide and hydrogen is rather stable over the measurement period. No ethylene or ethane was formed. The Figure cannot account for all the carbon in the feed. While carbon dioxide was also produced during the experiment (but not quantified), the remaining carbon cannot solely have been in the form of carbon dioxide, as the oxygen content in the feed was too low. Hence, it is possible that solid carbon species have formed on the catalyst during the experiment. This is further indicated by the fact that a significant amount of graphite (14.9 wt %) was found by XRD in the spent catalyst from run No. 2, in which the catalyst from run No. 1 was reused.

Figure 4:
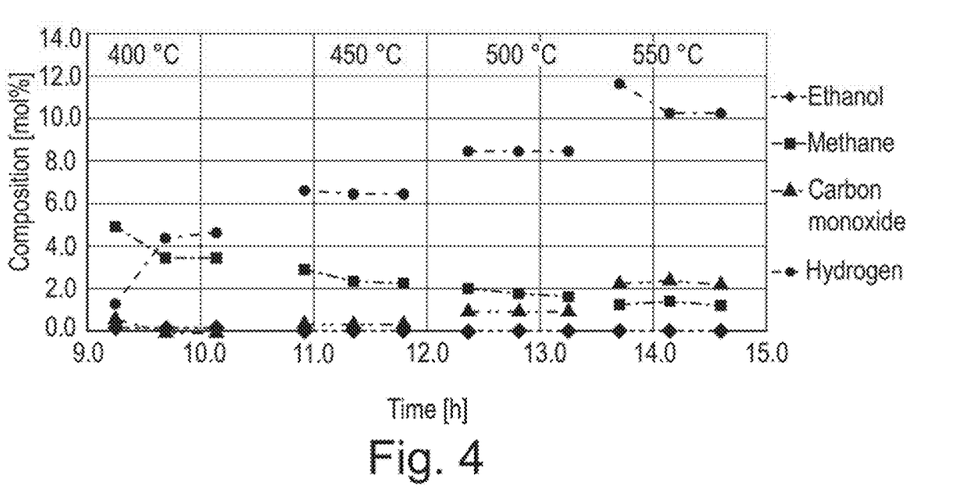
FIG. 4 illustrates the measured exit gas composition in run No. 2 with respect to ethanol, methane, carbon monoxide and hydrogen as a function of time. Inlet conditions: 3.27 vol % ethanol and 9.82 vol % water in nitrogen (S/C=1.5); total flow 100 Nml/min.
Figure 5:
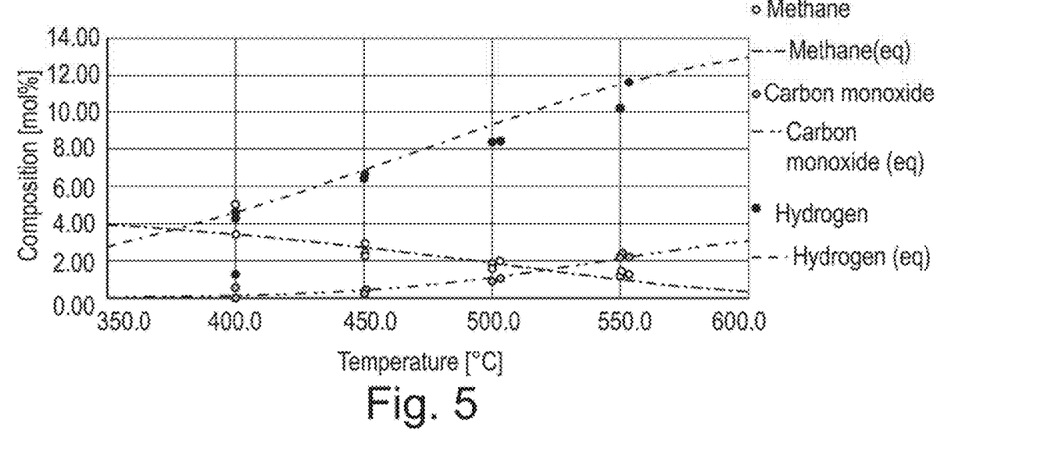
FIG. 5 illustrates the equilibrium (eq) and measured exit gas composition in run No. 2 with respect to methane, carbon monoxide and hydrogen as a function of temperature. Inlet conditions: 3.27 vol % ethanol and 9.82 vol % water in nitrogen (S/C=1.5)

FIG. 4 shows the exit concentration of ethanol, methane, carbon monoxide and hydrogen, measured during ethanol reforming in run No. 2 at 400-550° C. A total feed flow of 100 Nml/min containing 3.27 vol % ethanol and 9.82 vol % water vapor (corresponding to an S/C of 1.5) in nitrogen was used. As can be seen from the Figure, ethanol is completely converted at 400° C. As expected, the amount of methane produced decreases with temperature, while the amounts of carbon monoxide and hydrogen increase. In fact, there is an excellent agreement between the composition of the exit gas and the equilibrium composition, as shown in FIG. 5.

A fresh loading of the Ni—Zn/$Al_2O_3$ catalyst was used for propanol reforming in run No. 3. A total gas flow of 100 Nml/min containing 2.07 vol % propanol and 10.35 vol % water (S/C=1.67) in nitrogen was used. While complete propanol conversion was observed at 400° C., the pressure drop over the reactor increased rapidly, and so the experiment was aborted. The failure of this catalyst is most likely due to zinc being consumed by the alumina support rather than forming a ternary carbide with nickel, e.g. facilitated by the somewhat higher water content compared to that of run No. 2.

In run No. 4, a Zn/R-67 catalyst was used for propanol reforming. In this experiment, the feed consisted of 1400 ppmv methanol, 2.07 vol % propanol and 10.18 vol % water (S/C=1.63) in nitrogen. Again, the experiment was aborted because of an increasing pressure drop over the reactor. While a nickel zinc carbide was identified in the spent catalyst by X-ray diffraction, some free nickel (which could facilitate carbon formation) was also found in this sample (see Table 2).

Figure 6:
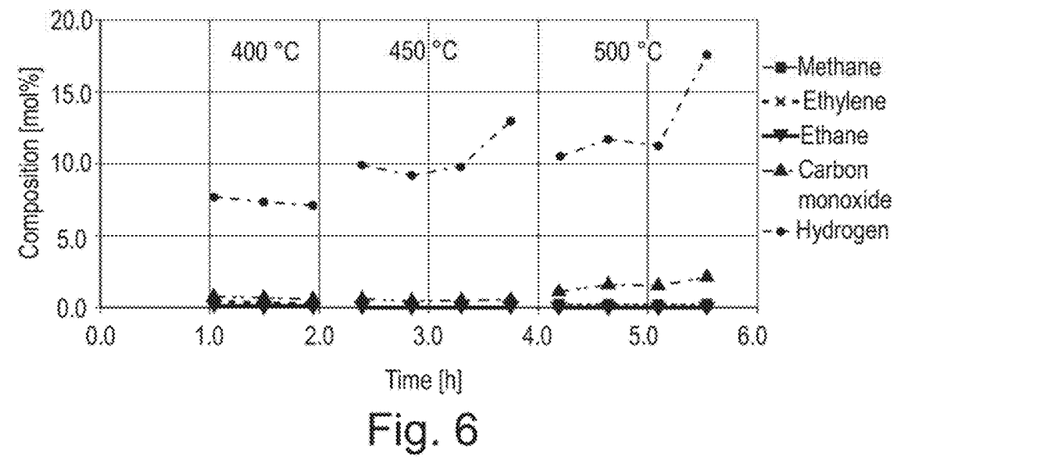
FIG. 6 and FIG. 7 show the propanol reforming in run No. 5; exit gas composition as measured with respect to methane, carbon monoxide and hydrogen as a function of time. Inlet conditions: 1400 ppmv methanol, 2.05 vol % propanol and 10.21 vol % water in nitrogen (S/C=1.63)
Figure 7:
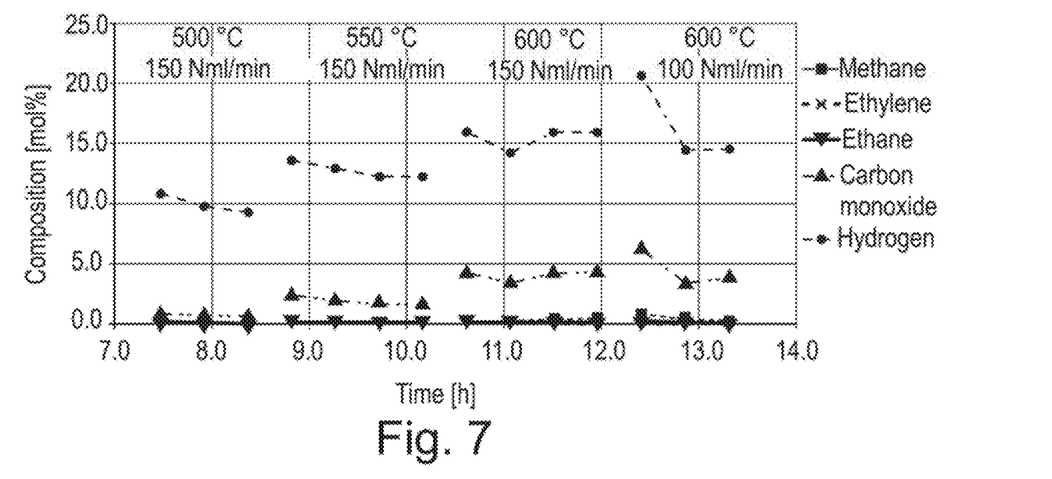

Using a Ni/SK-501 catalyst, propanol reforming was accomplished in run No. 5. In this case the feed gas consisted of 1400 ppmv methanol, 2.05 vol % propanol and 10.21 vol % water (S/C=1.63) in nitrogen. A total gas flow of 100-150 Nml/min was used. FIG. 6 and FIG. 7 show the resulting exit gas composition with respect to methane, ethylene, ethane, carbon monoxide and hydrogen, measured at temperatures between 400 and 600° C. As seen from the Figures, the primary products are carbon monoxide and hydrogen (and most likely also carbon dioxide). The production of carbon monoxide and hydrogen increases with the temperature, just as expected. At all conditions, very low amounts of hydrocarbons are produced. While the gas chromatography equipment used was not calibrated to quantify propanol, the chromatograms confirm complete conversion of propanol at 400° C.

Figure 8:
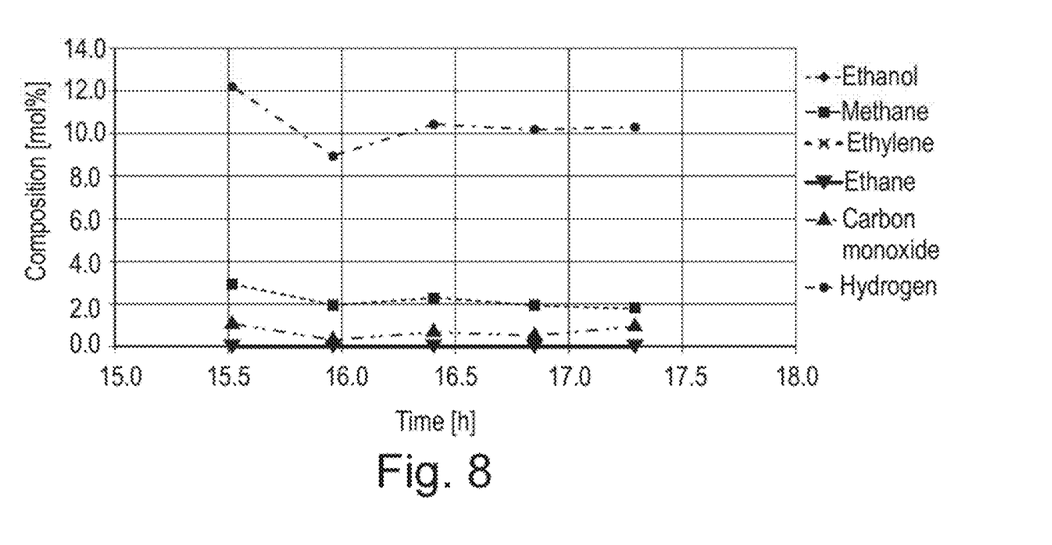
FIG. 8 illustrates the ethanol reforming in run No. 5; exit gas composition as measured with respect to ethanol, methane, carbon monoxide and hydrogen as a function of time. Inlet conditions: 1300 ppmv methanol, 3.24 vol % ethanol and 9.72 vol % water in nitrogen (S/C=1.47). Total flow: 100 Nml/min.

In FIG. 8, the results from ethanol reforming at 400° C. over the same catalyst loading are shown. The feed consisted of 1300 ppmv methanol, 3.24 vol % ethanol and 9.72 vol % water (S/C=1.47) in nitrogen, and the total flow was 100 Nml/min. As can be seen from the Figure, ethanol is converted completely into methane, carbon monoxide and hydrogen at 400° C. Only insignificant amounts of ethylene and ethane are produced.

Figure 9:
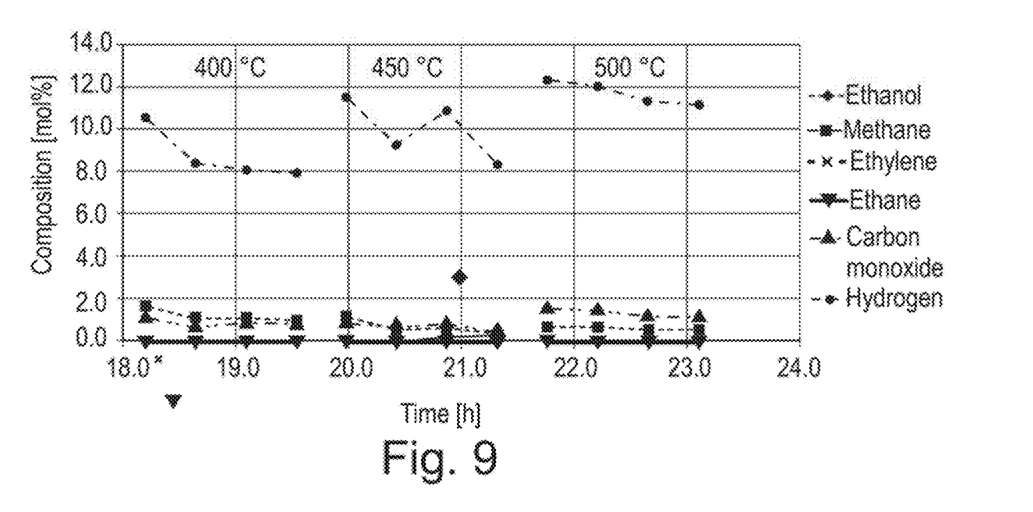
FIG. 9 illustrates the ethanol and acetic acid reforming in run No. 5; exit gas composition as measured with respect to ethanol, methane, carbon monoxide and hydrogen as a function of time. Inlet conditions: 2100 ppmv methanol, 1.99 vol % ethanol, 1.98 vol % acetic acid and 9.94 vol % water in nitrogen (S/C=1.22). Total flow: 100 Nml/min.

Steam reforming of a mixture of ethanol and acetic acid was also attempted in run No. 5, using a feed flow of 100 Nml/min consisting of 1900 ppmv ethanol, 1.98 vol % acetic acid and 9.94 vol % water (S/C=1.22) in nitrogen. The resulting exit gas composition with respect to ethanol, methane, ethylene, ethane, carbon monoxide and hydrogen, measured at temperatures between 400 and 500° C., is shown in FIG. 9. Again, the main products are methane, carbon monoxide and hydrogen (as well as carbon dioxide). Slight decreasing trends of the three species can be observed at each temperature step, which could cause catalyst deactivation. Apart from a few measurements, the Figure shows full conversion of ethanol. Unfortunately, acetic acid could not be properly detected by gas chromatography, hence its degree of conversion is unknown. Unidentified peaks were present in the chromatograms.

Figure 10:
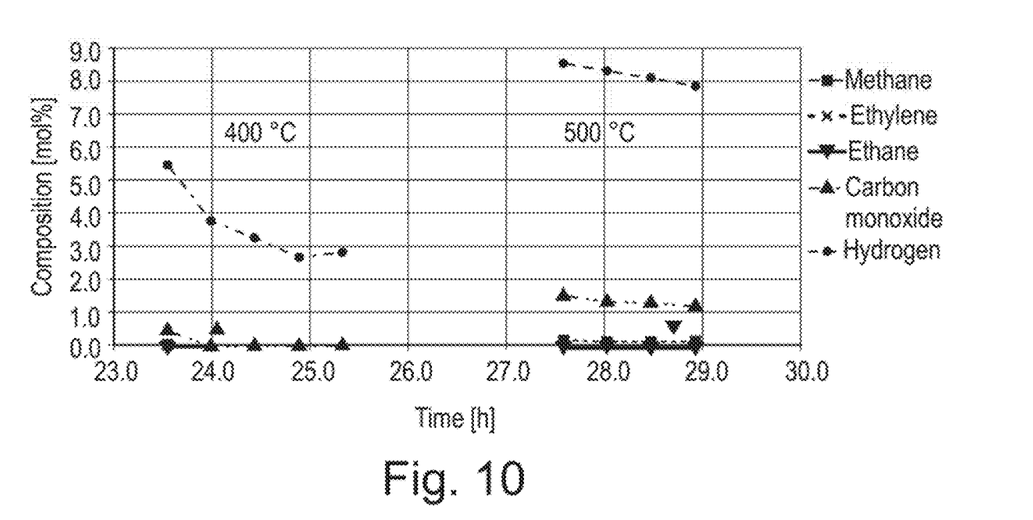
FIG. 10 illustrates the ethanol glycol reforming in run No. 5; exit gas composition as measured with respect to methane, carbon monoxide and hydrogen as a function of time. Inlet conditions: 1900 ppmv methanol, 1.99 vol % ethanol, 2.13 vol % ethylene glycol and 4.26 vol % water in nitrogen (S/C=0.95). Total flow: 100 Nml/min.

Finally, steam reforming of ethylene glycol was carried out at 400 and 500° C., likewise during run No. 5. A gas mixture of 1900 ppmv methanol, 2.13 vol % ethylene glycol and 4.26 vol % water (S/C=0.95) was fed to the reactor at a flow of 100 Nml/min. FIG. 10 shows the composition of the exit gas with respect to methane, ethylene, ethane, carbon monoxide and hydrogen. At 400° C., only hydrogen can be quantified, except for the first data point where some carbon monoxide was measured. As during the reforming of ethanol and acetic acid, the hydrogen production decreases over time. At 500° C., some carbon monoxide and a small amount of methane are also produced. The degree of conversion of ethylene glycol is unknown, because it could not be properly detected by gas chromatography. Unidentified peaks were present in the chromatograms.

In conclusion, steam reforming of ethanol, propanol, acetic acid and ethylene glycol, respectively, has been carried out over a range of Ni—Zn based catalysts. A fixed oxygen-to-carbon ratio of 2 was used.

Reforming of ethanol was successfully carried out over a 12 wt % Ni-16 wt % Zn/Al$_2$O$_3$ catalyst, reaching gas compositions close to equilibrium. Reforming of propanol over the same catalyst, however, caused a rapid increase in the pressure drop over the reactor. XRD on spent catalyst indicated formation of ZnAl$_2$O$_4$ rather than nickel zinc carbide. Steam reforming of propanol over an 18 wt % Zn/R-67 catalyst also resulted in clogging of the reactor. In this sample, both Ni$_3$ZnC and free nickel could be identified by XRD. Both propanol and ethanol reforming could successfully be carried out over a 6 wt % Ni/SK-501 catalyst. Steam reforming of an ethanol/acetic acid mixture as well as of ethylene glycol over the same catalyst also turned out to be possible, although with some signs of deactivation. The spent catalyst showed nickel solely in the form of alloys.

The formation of nickel zinc carbide is crucial in order to avoid carbon formation at low steam-to-carbon ratios. This requires the use of a support having no (further) affinity towards spinel formation with zinc. An obvious choice in this respect is ZnAl$_2$O$_4$.

The invention claimed is:

1. A process for steam reforming of oxygenates, in which a feed gas containing oxygenates, is converted into syngas according to the reactions over a nickel zinc carbide catalyst, and which after use shows nickel solely in the form of alloys, where the syngas is subsequently either transformed into desired chemicals or mixed into a feed stream to a reformer in a plant selected from the group consisting of an ammonia plant and a methanol plant.

* * * * *